United States Patent
Hwang et al.

(10) Patent No.: US 9,252,934 B2
(45) Date of Patent: Feb. 2, 2016

(54) SUPPORT OF NETWORK BASED POSITIONING BY SOUNDING REFERENCE SIGNAL

(71) Applicant: MEDIATEK INC., Hsinchu (TW)

(72) Inventors: Chien-Hwa Hwang, Hsinchu County (TW); Shiang-Jiun Lin, Hsinchu (TW); Yih-Shen Chen, Hsinchu (TW)

(73) Assignee: MEDIATEK INC. (TW)

( * ) Notice: Subject to any disclaimer, the term of this patent is extended or adjusted under 35 U.S.C. 154(b) by 0 days.

(21) Appl. No.: 14/713,158

(22) Filed: May 15, 2015

(65) Prior Publication Data

US 2015/0249527 A1    Sep. 3, 2015

Related U.S. Application Data

(63) Continuation of application No. 13/629,986, filed on Sep. 28, 2012, now Pat. No. 9,060,343.

(60) Provisional application No. 61/542,404, filed on Oct. 3, 2011.

(51) Int. Cl.
*H04L 5/00* (2006.01)
*H04W 72/12* (2009.01)
(Continued)

(52) U.S. Cl.
CPC ............ *H04L 5/0048* (2013.01); *H04L 5/0053* (2013.01); *H04L 5/0096* (2013.01);
(Continued)

(58) Field of Classification Search
CPC ............ H04W 48/10; H04W 72/0406; H04W 72/1278; H04W 64/00; H04W 71/1289; H04W 4/023; H04W 72/0413; H04W 56/006; H04L 43/08; H04L 5/0096; H04L 5/0053; H04L 5/0048; H04L 5/0078; H04L 1/0075; H04L 27/26; H04L 27/2611; H04L 27/2613; H04L 1/1607; H04B 17/27

USPC ........................ 370/203, 252, 328, 329, 330; 455/67.11, 450, 456.1–456.6
See application file for complete search history.

(56) References Cited

U.S. PATENT DOCUMENTS

2010/0309852 A1  12/2010  Li et al. .......................... 370/328
2011/0090862 A1   4/2011  Liang et al. ................... 370/329
(Continued)

FOREIGN PATENT DOCUMENTS

| CN | 101505485 A | 2/2008 |
| CN | 101330325 A | 7/2008 |

(Continued)

OTHER PUBLICATIONS

3GPP TS 36.211 V10.3.0 (Technical Specification); 3rd Generation Partnership Project; Technical Specification Group Radio Access Network; Evolved Universal Terrestrial Radio Access (E-UTRA); Physical Channels and Modulation (Release 10), (Sep. 2011), 103 pages.

(Continued)

*Primary Examiner* — Edan Orgad
*Assistant Examiner* — Ivan O Latorre
(74) *Attorney, Agent, or Firm* — Imperium Patent Works; Zheng Jin

(57) ABSTRACT

A method of network-based positioning using sounding reference signal (SRS) is proposed. An eNodeB configures a number of parameters of a periodic SRS transmission for a user equipment (UE). The eNodeB then transmits SRS configuration data for SRS measurements performed by a location measurement unit (LMU). The SRS configuration data includes cell-specific SRS bandwidth configuration and UE-specific SRS bandwidth configuration. The SRS configuration data may further include a number of antenna ports for SRS transmission, SRS frequency hopping bandwidth configuration, information on whether SRS sequence-group hopping is enabled, and $\Delta_{SS}$ when SRS sequence hopping is enabled. Upon receiving the SRS configuration data, the LMU is able to perform timing measurements over the received SRS signals from the UE. In one embodiment, the LMU detects SRS dropping to avoid performance degradation of the network-based positioning.

10 Claims, 6 Drawing Sheets

(51) Int. Cl.
*H04W 72/04* (2009.01)
*H04W 64/00* (2009.01)
*H04L 12/26* (2006.01)
*H04W 48/10* (2009.01)
(52) U.S. Cl.
CPC .............. *H04L 43/08* (2013.01); *H04W 64/00* (2013.01); *H04W 72/0406* (2013.01); *H04W 72/1278* (2013.01); *H04W 48/10* (2013.01)

(56) References Cited

U.S. PATENT DOCUMENTS

| | | | |
|---|---|---|---|
| 2011/0171964 | A1 | 7/2011 | Lin et al. .................... 455/450 |
| 2011/0260863 | A1 | 10/2011 | Hooli et al. .............. 340/539.32 |
| 2011/0268028 | A1 | 11/2011 | Stern-Berkowitz et al. .. 370/328 |
| 2011/0287804 | A1* | 11/2011 | Seo .................... H04W 52/146 455/522 |
| 2011/0292823 | A1 | 12/2011 | Barbieri et al. ............... 370/252 |
| 2012/0015667 | A1 | 1/2012 | Woo et al. .................. 455/456.1 |
| 2012/0020320 | A1 | 1/2012 | Issakov et al. ................ 370/330 |
| 2012/0083288 | A1 | 4/2012 | Siomina .................... 455/456.1 |
| 2012/0106495 | A1* | 5/2012 | Yang ........................ H04L 5/001 370/329 |
| 2012/0108270 | A1 | 5/2012 | Kazmi et al. ............... 455/456.5 |
| 2012/0129551 | A1 | 5/2012 | Islam ........................ 455/456.1 |
| 2012/0224557 | A1* | 9/2012 | Noh ........................ H04L 5/001 370/329 |
| 2012/0231809 | A1 | 9/2012 | Siomina et al. ............. 455/456.1 |
| 2013/0022019 | A1* | 1/2013 | Han ...................... H04L 5/0053 370/329 |
| 2013/0194908 | A1 | 8/2013 | Gao et al. ...................... 370/203 |

FOREIGN PATENT DOCUMENTS

| | | |
|---|---|---|
| CN | 101931860 A | 6/2009 |
| WO | WO2010129885 | 5/2009 |
| WO | WO2011013977 | 7/2009 |
| WO | WO2011105946 | 2/2010 |
| WO | WO2012036704 | 9/2010 |

OTHER PUBLICATIONS

3GPP TS 36.331 V10.2.0 (Technical Specification); 3rd Generation Partnership Project; Technical Specification Group Radio Access Network; Evolved Universal Terrestrial Radio Access (E-UTRA); Radio Resource Control (RRC); Protocol Specification (Release 10), (Jun. 2011), 294 pages.
International Search Report and Written Opinion of International Search Authority for PCT/CN2012/082440 dated Dec. 6, 2012 (10 pages).
JPO, Office Action Summary for the JP patent application 2014-532237 dated Jan. 6, 2015 (5 pages).
R1-106168 3GPP TSG RAN WG1 Meeting #63; Andrew Corporation; Summary of Evaluation for Network Based Positioning; Jacksonville, Florida, Nov. 15-19. (3 pages).
3GPP TS 36.211 V10.3.o (Sep. 2011); 3rd Generation Partnership Project; Technical specification Group radio Access Network; Evolved Universal Terrestrial Radio Access (E-UTRA); Physical Channels and Modulation (Release 10) (11 pages).
EPO, Search Report for the EP patent application 12838835.2 dated Oct. 30, 2015 (13 pages).
3GPP TSG RAN WG3 Meeting #69bis R1-102722, Andrew Corp., Signaling for LTE Network Based Positioning, Xi'an, China dated Oct. 11-15, 2010 (3 pages).
3GPP TSG RAN WG1 Meeting #59 R1-094485, Andrew Solutions, Uplink Signals for LTE Network Based Positioning, Jeju, Korea dated Nov. 9-13, 2009 (4 pages).
3GPP TSG-RAN WG2 Meeting #75 R2-114540, TruePosition, SRS Update Support in NBPS for LTE, Athens, Greece dated Aug. 22-26, 2011 (8 pages).
Draft 3GPP TS 36.211 Va.1.0(Mar. 2011); 3rd Generation Partnership Project; Technical Specification Group Radio Access Network; Evolved Universal Terrestrial Radio Access (E-UTRA); Physical Channels and Modulation (Release 10) *section 5.5.1.3*.
3GPP TSG RAN WG1 Meeting #63bis R1-110286, Research In Motion et al., Remaining Details of Aperiodic SRS, Dublin, Ireland dated Jan. 17-21, 2011 (7 pages).
3GPP TSG RAN WG1 R1-102586, MediaTek, Simulation assumptions for Network-Based Positioning, Telephone conference May 6, 2010 (3 pages).
3GPP TSG RAN WG1 Meeting #66 R1-112666, Fujitsu, Consideration on SRS Enhancement for DL CoMP, Athens, Greece dated Aug. 22-26, 2011 (3 pages).
3GPP TSG RAN WG1 Meeting #63 R1-105978, ZTE, Remaining Issues of Aperiodic SRS, Jacksonville, FL. US dated Nov. 15-19, 2010 (4 pages).

\* cited by examiner

| CATEGORY | PARAMETERS |
|---|---|
| GENERAL | C-RNTI of the target UE |
| | Serving eNodeB eCGI, PCI |
| | UL-EARFCN |
| | Cyclic prefix configuration |
| | Number of SRS transmission for positioning |
| SRS | Group-hopping-enabled |
| | Disable-sequence-group-hopping |
| | Sequence-hopping-enabled |
| | $N_{ID}^{CELL}$ |
| | $n_s$ in which the first SRS transmission for positioning takes place |
| | $\Delta_{SS}$ |
| | cyclicShift |
| | Srs-AntennaPort-r10 |
| | Srs-BandwidthConfig |
| | Srs-Bandwidth |
| | $N_{SC}^{RB}$ |
| | $N_{RB}^{UL}$ |
| | Duration |
| | transmissionComb |
| | $n_f$ in which the first SRS transmission for positioning takes place |
| | Srs-HoppingBandwidth |
| | freqDomainPosition |
| | Srs-ConfigIndex |
| | ue-TransmitAntennaSelection |
| | ue-TransmitAntennaSelection-r10 |
| | Frame structure type |
| | TDD UL/DL configuration |
| | srsMaxUpPts |
| | PRACH configuration index |
| | TDD special subframe configuration |
| | A bitmap indicating which SRS were dropped |

FIG. 5

| PARAMETER CATEGORY | PARAMETERS |
|---|---|
| GENERAL | C-RNTI |
| | PCI OF PCELL |
| | UL-EARFCN |
| | TIMING ADVANCE MEASUREMENT FOR THE UE IN PCELL |
| | SERVING eNB eCGI (FFS) |
| SRS FOR THE PCELL WHICH SRS IS CONFIGURED | UL CYCLIC PREFIX |
| | UL SYSTEM BANDWIDTH OF THE CELL |
| | CELL-SPECIFIC SRS BANDWIDTH CONFIGURATION (srs-BandwidthConfig) |
| | UE-SPECIFIC SRS BANDWIDTH CONFIGURATION (srs-Bandwidth) |
| | NUMBER OF ANTENNA PORTS (srs-AntennaPort) |
| | FREQUENCY DOMAIN POSITION |
| | SRS FREQUENCY HOPPING BANDWIDTH CONFIGURATION |
| | SRS-CYCLIC SHIFT |
| | TRANSMISSION COMB |
| | SRS CONFIGURATION INDEX |
| | MaxUpPt (TDD ONLY) |
| | GROUP-HOPPING-ENABLED |
| | $\Delta_{ss}$ (WHEN SRS SEQUENCE HOPPING IS USED) |

FIG. 6

| PARAMETER CATEGORY | PARAMETERS |
|---|---|
| GENERAL | C-RNTI |
| | PCI OF PCELL |
| | UL-EARFCN OF PCELL |
| | SEARCH WINDOW PARAMETERS [T-Δ, T+Δ] (EXPECTED PROPAGATION DELAY T, DELAY UNCERTAINTY Δ) |
| SRS FOR THE PCELL WHICH SRS IS CONFIGURED AND TO BE MEASURED BY LMU | UL CYCLIC PREFIX |
| | UL SYSTEM BANDWIDTH OF THE PCELL |
| | CELL-SPECIFIC SRS BANDWIDTH CONFIGURATION (srs-BandwidthConfig) |
| | UE-SPECIFIC SRS BANDWIDTH CONFIGURATION (srs-Bandwidth) |
| | NUMBER OF ANTENNA PORTS |
| | FREQUENCY DOMAIN POSITION |
| | SRS FREQUENCY HOPPING BANDWIDTH CONFIGURATION |
| | SRS-CYCLIC SHIFT |
| | TRANSMISSION COMB |
| | SRS CONFIGURATION INDEX |
| | MaxUpPt (TDD ONLY) |
| | GROUP-HOPPING-ENABLED |
| | $\Delta_{ss}$ (WHEN SRS SEQUENCE HOPPING IS USED) |

FIG. 7

SUPPORT OF NETWORK BASED POSITIONING BY SOUNDING REFERENCE SIGNAL

CROSS REFERENCE TO RELATED APPLICATIONS

This application is a continuation, and claims priority under 35 U.S.C. §120 from nonprovisional U.S. patent application Ser. No. 13/629,986, entitled "Support of Network Based Positioning by Sounding Reference Signal," filed on Sep. 28, 2012, the subject matter of which is incorporated herein by reference. Application Ser. No. 13/629,986, in turn, claims priority under 35 U.S.C. §119 from U.S. Provisional Application No. 61/542,404, entitled "Support of Network Based Positioning by Sounding Reference Signal," filed on Oct. 3, 2011, the subject matter of which is incorporated herein by reference.

TECHNICAL FIELD

The disclosed embodiments relate generally to wireless network communications, and, more particularly, to network-based positioning of user equipments using sounding reference signals.

BACKGROUND

Mobile phone tracking refers to attaining of the current position of a mobile phone (user equipment (UE)), stationary or moving. Localization may occur either via multilateration of radio signals between several radio towers of the network and the UE, or simply via GPS. Localization-based systems can be broadly divided into network-based, handset-based, SIM-based, and/or hybrid. Network-based positioning techniques utilize the service provider's network infrastructure to identify the location of a UE. The advantage of network-based positioning techniques is that they can be implemented non-intrusively, without affecting the UE.

In network-based positioning, the UE position is estimated based on timing measurements of the sounding reference signal (SRS) taken at different Location Measurement Units (LMUs), along with the knowledge of the geographical coordinates of the LMUs. The time required for an uplink SRS signal transmitted by a UE to reach an LMU is proportional to the length of the transmission path between the UE and the LMU. Therefore, the LMU is able to calculate the UE's distance by uplink SRS timing measurements. Typically, a set of LMUs (e.g., three LMUs) can be used to sample the SRS at the same time to estimate the UE's location.

In 3GPP LTE wireless communication systems, two types of SRS are defined. A first type of Periodic SRS (p-SRS) is used for obtaining long-term channel information. Before a UE starts p-SRS transmission, its serving base station (eNodeB) needs to allocate periodic SRS resources and configure SRS parameters to the UE by higher layer signaling. A second type of Aperiodic SRS (ap-SRS) is triggered by uplink grant via physical downlink control channel (PDCCH). Once triggered, the UE transmits a sounding sequence in a pre-defined location. Typically, in addition to obtaining channel information, p-SRS is also used for network-based positioning.

In order to obtain uplink SRS measurements, the LMUs need to know the characteristics of the uplink SRS signal transmitted by the UE for the period required to calculate uplink measurements. These characteristics have to be static over the periodic transmission of SRS. Hence, the eNodeB will be requested communicate to an Enhanced Serving Mobile Location Center (E-SMLC) these SRS characteristics so that the E-SMLC can configure the LMUs accordingly. The eNodeB is responsible for allocating the target UE SRS resources and communicating the SRS configurations to the E-SMLC. If the eNodeB determines that it will be unable to configure the target UE, then the eNodeB sends a failure indication to the E-SMLC.

The 3GPP LTE specification has defined various SRS parameters (e.g., cell-specific SRS parameters and UE-specific SRS parameters) for uplink SRS transmission for each target UE. For example, different SRS parameters are defined for SRS sequence-group hopping and sequence hopping, SRS resource allocation, SRS frequency hopping, UE antenna selection, and TDD-specific parameters, etc. To achieve accurate SRS measurements, the serving eNodeB needs to determine what part of the SRS configuration data of the target UE needs to be transferred from the eNodeB to the E-SMLC and from the E-SMLC to the LMUs.

Furthermore, according to 3GPP LTE specification, a UE shall abandon the transmission of SRS in a subframe if the coincidence of some specific uplink channels in the same subframe occurs. This SRS dropping is unknown to the LMUs because the rules governing the SRS dropping are quite complex and it is unlikely for the eNodeB to transfer all the information related to the SRS dropping rules to the LMUs. In this case, the LMUs may try to measure the SRS from the target UE even if the SRS is not transmitted at all. Therefore, handling SRS dropping is required to avoid causing performance degradation of the network-based positioning technique.

SUMMARY

A method of network-based positioning using sounding reference signal (SRS) is proposed. An eNodeB configures a number of parameters of a periodic SRS transmission for a user equipment (UE). The eNodeB then transmits SRS configuration data for SRS measurements performed by a location measurement unit (LMU). The SRS configuration data includes cell-specific SRS bandwidth configuration and UE-specific SRS bandwidth configuration. The SRS configuration data may further include a number of antenna ports for SRS transmission, SRS frequency hopping bandwidth configuration, information on whether SRS sequence-group hopping is enabled, and $\Delta_{SS}$ when SRS sequence hopping is enabled. Upon receiving the SRS configuration data, the LMU is able to perform timing measurements over the received SRS signals from the UE.

In one embodiment, the eNodeB may avoid or reduce SRS dropping by proper SRS configuration and/or scheduling. Dropping of SRSs is concerned with the transmission instances of SRS, PUCCH, PUSCH, and PRACH. The coincidence of SRS and some specific PUCCH/PUSCH/PRACH in the same subframe can be reduced by proper UE configuration and/or scheduling. In another embodiment, the eNodeB may send a bitmap that explicitly indicates SRS dropping instances. For example, the length of the bitmap is equal to the total number of possible SRS transmission instances for the positioning, with each bit indicates whether each SRS is dropped. In yet another embodiment, the LMU autonomously detects SRS dropping to avoid performance degradation of the network-based positioning. The LMU detects SRS dropping using the maximum value of the cross-correlation between the SRS input sequence and the received sequence around the arrival time of the SRS signal with various timing offsets. If this maximum value is lower than a threshold, then the LMU can assume that the SRS signal is dropped in this transmission instance.

Other embodiments and advantages are described in the detailed description below. This summary does not purport to define the invention. The invention is defined by the claims.

BRIEF DESCRIPTION OF THE DRAWINGS

Other The accompanying drawings, where like numerals indicate like components, illustrate embodiments of the invention.

FIG. 5 illustrates a list of SRS configuration parameters related to SRS measurements.

FIG. 6 illustrates necessary SRS configuration data transferred from an eNodeB to an e-SMLC.

FIG. 7 illustrates necessary SRS configuration data transferred from an e-SMLC to an LMU.

DETAILED DESCRIPTION

Reference will now be made in detail to some embodiments of the invention, examples of which are illustrated in the accompanying drawings.

Figure 1:
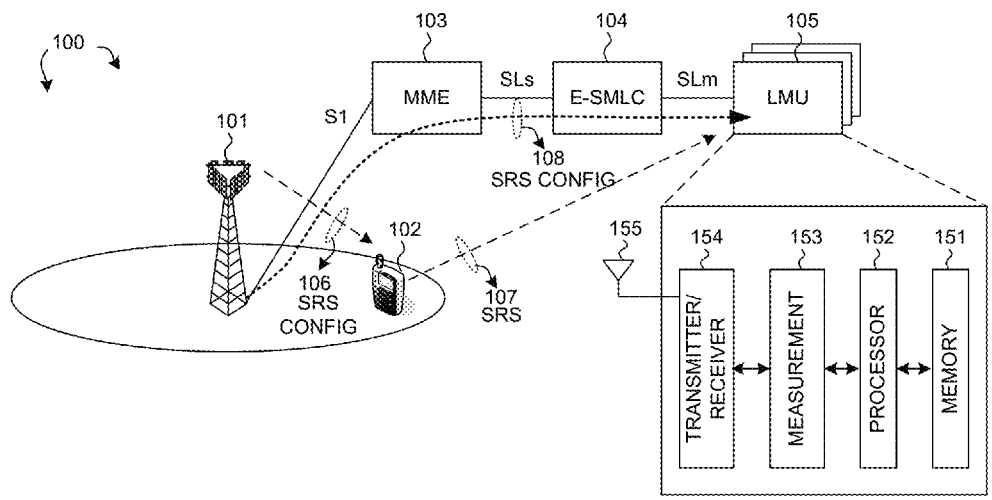
FIG. 1 illustrates network-based positioning using sounding reference signal (SRS) in a wireless communication system in accordance with one novel aspect.

FIG. 1 illustrates network-based positioning using sounding reference signal (SRS) in a wireless communication system 100 in accordance with one novel aspect. Wireless communication system 100 comprises a base station eNodeB 101, a user equipment UE 102, a mobility management entity MME 103, an enhanced serving mobile location center e-SMLC 104, and a set of location measurement units LMUs 105. In 3GPP LTE systems, UE communicates with its serving eNodeB via radio access air interface, eNodeB communicates with MME via S1 interface, MME communicates with e-SMLC via SLs interface, and e-SMLC communicates with LMUs via SLm interface. In 3GPP LTE systems, one way of providing channel information is via the use of uplink channel sounding. Channel sounding is a mechanism where the UE transmits SRS signals on an uplink channel to enable the eNodeB to estimate the uplink channel response. Periodic SRS signals can also be used for network-based positioning. In network-based positioning, when the network operator decides to identify the location of a UE, the UE position is estimated based on timing measurements of the SRS signals taken at the LMUs, along with the knowledge of the geographical coordinates of the LMUs.

In order to obtain uplink SRS timing measurements, the LMUs need to know the characteristics of the SRS signals transmitted by the UE for the period required to calculate the timing measurements. In one novel aspect, eNodeB 101 configures and schedules UE 102 for periodic SRS transmission, and sends necessary SRS configuration data to the LMUs. Based on the received SRS configuration data, the LUMs are able to properly obtain the timing measurements. As illustrated in FIG. 1, eNodeB 101 transmits SRS configuration 106 to UE 102 for SRS scheduling information and SRS transmission parameters. Based on the SRS configuration, UE 102 transmits periodic SRSs 107 accordingly. Furthermore, eNodeB 101 also transmits necessary SRS configuration 108 to LMUs 105 via MME 103 and e-SMLC 104. Upon receiving the SRS configuration 108, LMUs 105 are able to properly obtain the uplink SRS timing measurements.

Each LMU comprises memory 151 having program instructions, a processor 152 that executes the program instructions, a measurement module 153 that performs measurement on received radio signals, and a radio frequency (RF) module 154 having a transmitter and receiver coupled to antenna 155 to receive radio signals. The different modules are function modules and may be implemented by software, hardware, firmware, or any combination thereof. The function modules, when executed by processor 152 (via program instructions contained in memory 151), interwork with each other to allow LMUs 105 to receive sounding reference signals from UE 102, and perform SRS timing measurements based on SRS configuration data received from eNodeB 101.

Figure 2:
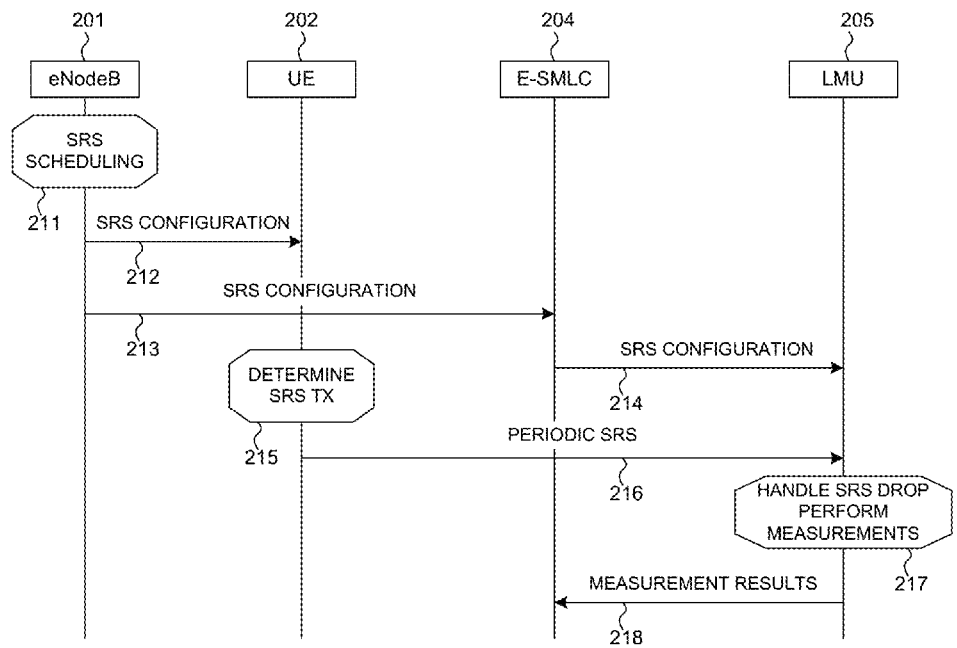
FIG. 2 illustrates a procedure of network-based positioning based on periodic SRS.

FIG. 2 illustrates a procedure of network-based positioning based on periodic SRS in an LTE mobile network. In step 211, eNodeB 201 determines SRS configuration and/or scheduling for UE 202 for periodic SRS transmission. In one advantageous aspect, SRS dropping is avoided by proper SRS configuration and/or scheduling. In step 212, eNodeB 201 transmits the SRS parameters to UE 202. In step 213, eNodeB 201 transmits necessary SRS configuration data to e-SMLC 204 (via MME, not shown), and e-SMLC 204 in turn transmits the necessary SRS configuration data to LMU 205 in step 214. On one advantageous aspect, the SRS configuration data includes all relevant SRS parameters necessary for SRS timing measurements. In another advantageous aspect, eNodeB 201 also sends a bitmap indicating SRS dropping instances. In step 215, UE 202 determines when to transmit periodic SRS based on the configured SRS parameters. If there is a scheduling conflict, then UE 202 drops corresponding SRS transmission. In step 216, UE 202 transmits periodic SRS signals to LMU 205. In step 217, LMU 205 performs timing measurements for the received SRS signals. In one advantageous aspect, LMU 205 autonomously detects any dropped SRS instances. In step 218, LMU 205 sends measurement results to e-SMLC 204 to determine the location of UE 202.

Figure 3:
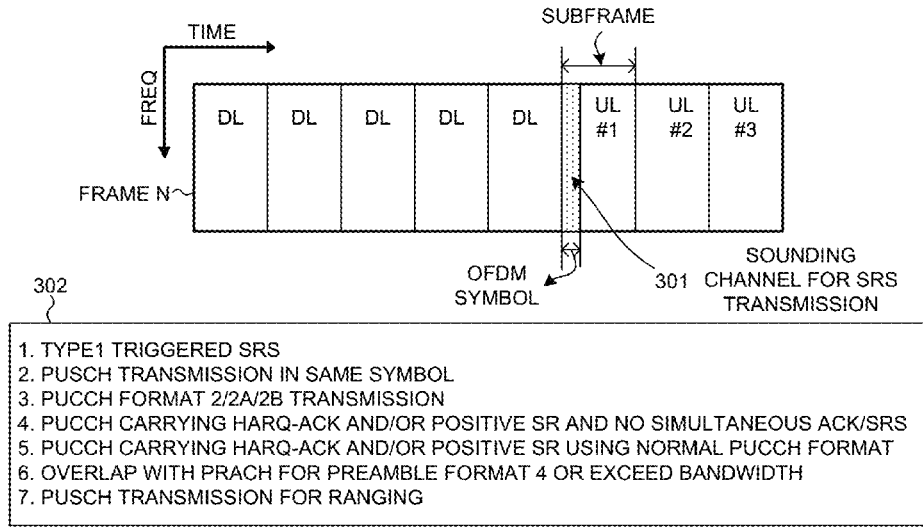
FIG. 3 illustrates SRS scheduling and SRS dropping handling in accordance with one novel aspect.

FIG. 3 illustrates SRS scheduling and SRS dropping handling in accordance with one novel aspect. In an LTE wireless communication system, an eNodeB and a UE communicate with each other by sending and receiving data carried in a series of frames. Each frame comprises a number of downlink (DL) subframes for the eNodeB to transmit data to the UE, and a number of uplink (UL) subframes for the UE to transmit data to the eNB. In the example of FIG. 3, frame N contains three consecutive uplink subframes UL#1, UL#2, and UL#3 following five consecutive downlink subframes. In the LTE system, two types of SRS are defined for uplink channel sounding. A first type of Periodic SRS (p-SRS) (e.g., trigger type0) is used for obtaining long-term channel information. Before a UE starts p-SRS transmission, its serving base station (eNodeB) needs to configure SRS parameters and allocate SRS resources to the UE by higher layer signaling. A second type of Aperiodic SRS (ap-SRS) (e.g., trigger type1) is triggered by uplink grant via physical downlink control channel (PDCCH). Once triggered, the UE transmits a sounding sequence in a pre-defined location.

Periodic SRS is used for network-based positioning. For periodic SRS transmission, the eNodeB configures SRS parameters and allocates SRS resource for scheduled SRS transmission. For example, in subframe UL#1, a sounding channel 301 is allocated in the first OFDM symbol for SRS transmission. According to 3GPP TS 36.213, type0-triggered periodic SRS shall be dropped by the UE under certain scenarios. The different scenarios for SRS dropping are listed in FIG. 3 block 302.

In a first scenario, if both trigger type0 and trigger type1 SRS transmission would occur in the same subframe in the same serving cell, then the UE only transmits type1-triggered SRS. In a second scenario, the UE does not transmit SRS whenever SRS and physical uplink shared channel (PUSCH) transmission happen to coincide in the same OFDM symbol. In a third scenario, the UE does not transmit type0-triggered SRS whenever type0-triggered SRS and physical uplink control channel (PUCCH) format 2/2a/2b transmission happen to coincide in the same subframe. In a fourth scenario, the UE does not transmit SRS whenever SRS transmission and PUCCH transmission carrying HARQ-ACK and/or positive SR happen to coincide in the same subframe if the parameter ackNackSRS-SimultaneousTransmission is FALSE. In a fifth scenario, the UE does not transmit SRS whenever SRS transmission on any serving cells and PUCCH transmission carrying HARQ-ACK and/or positive SR using normal PUCCH format as defined in Section 5.4.1 and 5.4.2A of 3GPP TS 36.211 happen to coincide in the same subframe. In a sixth scenario, in UpPTS, whenever SRS transmission instance overlaps with the PRACH region for preamble format 4 or exceeds the range of uplink system bandwidth configured in the serving cell, the UE does not transmit SRS. Finally, in a seventh scenario, the UE does not transmit SRS whenever SRS and a PUSCH transmission corresponding to a random access response grant or a retransmission of the same transport block as part of the contention based random access procedure coincide in the same subframe.

The above-illustrated SRS dropping is unknown to the LMUs because the rules governing the SRS dropping are quite complex and it is unlikely for the eNodeB to transfer all the information related to the SRS dropping rules to the LMUs. Therefore, proper handling of the SRS dropping is required to avoid the performance degradation of network-based positioning.

From the eNodeB side, SRS dropping may be handled in two ways. In a first method, the eNodeB may avoid or reduce SRS dropping by proper SRS configuration and/or scheduling. Dropping of SRSs is concerned with the transmission instances of SRS, PUCCH, PUSCH, and PRACH. The coincidence of SRS and some specific PUCCH/PUSCH/PRACH in the same subframe (as identified in the scenarios in FIG. 3) can be reduced by proper UE configuration and/or scheduling. Specifically, when network-based positioning is triggered for a UE, besides SRS reconfiguration, some other parameters, e.g. CSI feedback period and offset, UE scheduled subframes, and hence the subframes for HARQ-ACK transmission etc., concerned with the transmission of PUCCH/PUSCH/PRACH, may be designed to reduce the number of SRS droppings. In a second method, the eNodeB may send a bitmap that explicitly indicates SRS dropping instances. The serving eNodeB of the target UE has the full knowledge of whether each SRS is dropped. The serving eNodeB may send this information in a bitmap to e-SMLC and then to each LMU performing measurements to indicate which SRSs have been dropped. For example, the length of the bitmap is equal to the total number of possible SRS transmission instances for the positioning, with each bit indicates whether each SRS is dropped.

Figure 4:
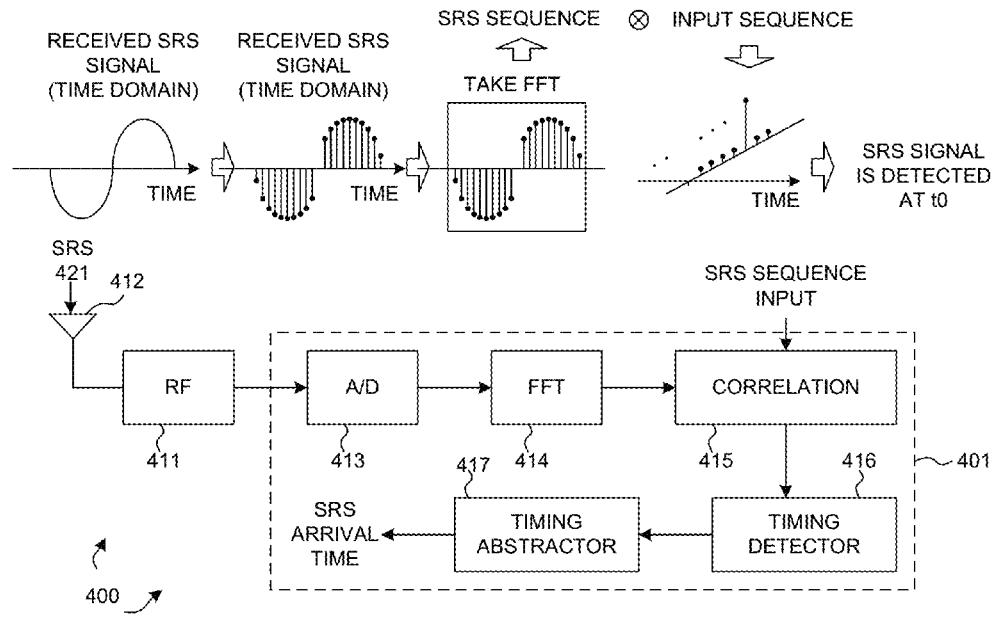
FIG. 4 illustrates one embodiment of handling SRS dropping by a location measurement unit (LMU).

From the LMU side, the LMU may autonomously detect SRS dropping to avoid performance degradation of the network-based positioning. FIG. 4 illustrates one embodiment of handling SRS dropping by a location measurement unit (LMU) 400. LMU 400 comprises a radio frequency (RF) module 411 coupled to an antenna 412, and a measurement module 401 having an analog-to-digital (A/D) converter 413, a fast Fourier transfer (FFT) module 414, a correlation module 415, a timing detector 416, and a timing abstractor 417. In the example of FIG. 4, an SRS signal 421 is transmitted by a target UE to LMU 400. RF module 411 first receives the analog SRS signal via antenna 412 in time domain. The analog SRS signal is then digitized by A/D converter 413 to a digital signal, which is transferred by FFT module 414 at a time instance into a received sequence in frequency domain. The received sequence is then cross-correlated with the actual SRS sequence input with various time offsets by correlation module 415. Based on the cross-correlation value, timing detector 416 detects the SRS signal at a specific time instance corresponds to a maximum value. The timing abstractor then selects the time instance as the arrival time of the SRS signal. Thus, LMU 400 can estimate the target UE's distance based on the time offset between the transmitted SRS signal and the received SRS signal.

In one novel aspect, LMU 400 is able to detect SRS dropping using the maximum value of the cross-correlation between the SRS input sequence and the received sequence around the arrival time of the SRS signal with various timing offsets. If this maximum value is lower than a threshold (e.g., no strong correlation), then LMU 400 can assume that the SRS signal is dropped in this transmission instance. In such case, the received signal corresponding to this transmission instance is not taken into account in the SRS measurements.

The above-illustrated methods of handling SRS dropping may be applied together. For example, avoidance of SRS dropping by configuration/scheduling has the benefit of improving the positioning accuracy by reducing the number of ineffective SRS measurements. It can be used in conjunction with the autonomous detection and the bitmap indication methods.

For periodic SRS transmission, various SRS parameters (e.g., both cell-specific parameters and UE-specific parameters) are defined in 3GPP LTE systems. FIG. 5 illustrates a list of configuration information related to SRS measurements. The SRS parameters are categorized according to the features related to SRS, and relevance of each parameter to SRS measurements is described below.

A first group of SRS parameters is related to SRS sequence-group hopping and sequence hopping. Those parameters include Group-hopping-enabled, Disable-sequence-group-hopping, Sequence-hopping-enabled, $N_{ID}^{cell}$, $n_s$ in which the first SRS transmission for positioning takes place, and $\Delta_{SS}$. SRS sequence-group hopping can be enabled or disabled by cell-specific parameter Group-hopping-enabled provided by high layers. However, SRS sequence-group hopping can also be disabled for a certain UE through high-layer parameter Disable-sequence-group-hopping despite being enabled on a cell basis. The sequence-group number u of a SRS sequence in slot $n_s$ is defined by a group hopping pattern $f_{gh}(n_s)$ and a sequence-shift pattern $f_{ss}$ according to u=$(f_{gh}(n_s)+f_{ss})$ mod 30. The sequence-shift pattern $f_{ss}$ is given by $f_{ss}=N_{ID}^{cell}$ mod 30. The group-hopping pattern $f_{gh}(n_s)$ is given by the following equation:

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$

where the pseudo-random sequence c(i) shall be initialized with $c_{init} = \lfloor N_{ID}^{cell}/30 \rfloor$ at the beginning of each radio frame. If an LMU always begins measuring the SRS for positioning at the start of a radio frame, then $n_s$=0, and there is no need to transfer this information. Otherwise, the value of $n_s$ in which the first SRS transmission for positioning takes place needs to be transferred.

The parameter Sequence-hopping-enabled provided by higher layers determines if sequence hopping is enabled or not. The base sequence number v within the base sequence group in slot $n_s$ is defined by:

$$v = \begin{cases} c(n_s) & \text{if } M_{sc}^{RS} \geq 6N_{sc}^{RB} \text{ and group hopping is} \\ & \text{disabled and sequence hopping is enabled} \\ 0 & \text{otherwise} \end{cases}$$

where c(n) shall be initialized with $c_{init} = \lfloor N_{ID}^{cell}/30 \rfloor \cdot 2^5 + f_{ss}^{PUSCH}$ the beginning of each radio frame, $f_{ss}^{PUSCH} = (N_{ID}^{cell} \bmod 30 + \Delta_{ss}) \bmod 30$, and $\Delta_{ss} \in \{0, 1, \ldots, 29\}$ is configured by higher layers. Therefore, when SRS sequence hopping is enabled, then $\Delta_{SS}$ needs to be transferred.

A second group of SRS parameters is related to the time/frequency resources of SRS and SRS sequence code. Those parameters include cyclicShift, srs-AntennaPort-r10, srs-BandwidthConfig, srs-Bandwidth, $N_{sc}^{RB}$, $N_{RB}^{UL}$, duration, transmissionComb, and $n_f$ in which the first SRS transmission for positioning takes place. The sounding reference signal sequence is $r_{SRS}^{(\tilde{p})} = r_{u,v}^{(\alpha_{\tilde{p}})}(n)$, where the cyclic shift $\alpha_{\tilde{p}}$ is given as:

$$\alpha_{\tilde{p}} = 2\pi \frac{n_{SRS}^{cs,\tilde{p}}}{8}, n_{SRS}^{cs,\tilde{p}} = \left(n_{SRS}^{cs} + \frac{8\tilde{p}}{N_{ap}}\right) \bmod 8,$$

$$\tilde{p} \in \{0, 1, \ldots, N_{ap} - 1\}$$

where $n_{SRS}^{cs} \in \{0,1,2,3,4,5,6,7\}$ is configured by the higher-layer parameters cyclicShift for each UE, and $N_{ap}$ is the number of antenna ports used for SRS transmission provided by higher layer parameter srs-AntennaPort-r10.

According to 3GPP TS 36.213, a UE configured for SRS transmission on multiple antenna ports of a serving cell shall transmit SRS for all the configured transmit antenna ports within one SC-FDMA symbol of the same subframe of the serving cell. The SRS transmission bandwidth and starting physical resource block assignment are the same for all the configured antenna ports of a given serving cell. Thus, the sequences of SRS from different transmit antennas are separated by different values of cyclic shifts $n_{SRS}^{cs,\tilde{p}}$ in the phase. Based on the DFT property $x(n-n_0) \leftrightarrow X(k)e^{-j2\pi n_0 k/N}$, these received SRS signals in the time domain from different antenna ports become multiple time-shifted versions of the same sequence.

Since the LMU estimates the distance between itself and the target UE by means of the time offset between the transmitted and received SRS signals, configuring SRS transmission in multiple antenna ports tends to cause errors in distance estimation. Moreover, the SRS sequence shall be multiplied with the amplitude-scaling factor $1/\sqrt{N_{ap}}$ in order to conform to the total UE transmit power. This amplitude scaling leads to power reduction of each received SRS signal. Consequently, in the configuration of SRS for positioning purpose, the number of antenna ports for SRS transmission $N_{ap}$ shall be equal to one.

The cell-specific parameter srs-BandwidthConfig, $C_{SRS} \in \{0,1,2,3,4,5,6,7\}$ and the UE-specific parameter srs-Bandwidth, $B_{SRS} \in \{0,1,2,3\}$ are given by higher layers to indicate $m_{SRS,b}$ and $N_b$, b=0, 1, 2, 3, values in Tables 5.5.3.2-1 to 5.5.3.2-4 of 3GPP TS 36.211, where $N_{RB}^{UL}$ is needed for table lookup. The length of the SRS sequence is given as $M_{sc,b}^{RS} = m_{SRS,b} N_{sc}^{RB}/2$. In a normal uplink subframe, the frequency-domain starting position $k_0^{(p)}$ depends on the transmissionComb. In UpPTS, $k_0^{(p)}$ is a function of the system frame number $n_f$ and the transmissionComb. The parameter duration (single or indefinite until disabled) is defined in 3GPP TS 36.331 for trigger type 0. As it requires a number of SRS measurements to determine the UE position, the parameter duration shall be set as 'TRUE'.

A third group of SRS parameters is related to frequency hopping of SRS. The parameters include srs-HoppingBandwidth, freqDomainPosition, and srs-ConfigIndex. The frequency hopping of the SRS is configured by the parameter $b_{hop} \in \{0,1,2,3\}$, provided by higher-layer parameter srs-HoppingBandwidth. If frequency hopping of the SRS is not enabled (i.e., $b_{hop} \geq B_{SRS}$), the frequency position index $n_b$ depends on the parameter $n_{RRC}$ given by higher-layer parameters freqDomainPosition. If frequency hopping of the SRS is enabled (i.e., $b_{hop} < B_{SRS}$), the frequency position index $n_b$ is a function of $n_{RRC}$, UE-specific periodicity of SRS transmission $T_{SRS}$, and SRS subframe offset $T_{offset}$, where $T_{SRS}$ and $T_{offset}$ are determined by the higher-layer parameter srs-ConfigIndex.

A fourth group of SRS parameters is related to UE antenna selection. The parameters include ue-TransmitAntennaSelection and ue-TransmitAntennaSelection-r10. When antenna selection is enabled for a given serving cell for a UE, the index of the UE antenna that transmits the SRS varies with time. In terms of positioning accuracy, it is beneficial for the LMU to know which SRS transmission instances are from the same antenna. Thus, the LMU needs to know whether the target UE is configured with antenna selection.

A fifth group of SRS parameters is related to TDD specific systems. Those parameters include Frame structure type, TDD UL/DL configuration, srsMaxUpPts, PRACH configuration index, and TDD special subframe configuration. For UpPTS, $m_{SRS,0}$ shall be reconfigured to $m_{SRS,0}^{max} = \max_{c \in C}\{m_{SRS,0}^{c}\} \leq (N_{RB}^{UL} - 6N_{RA})$ if this reconfiguration is enabled by the cell-specific parameter srsMaxUpPts given by higher layers, otherwise if the reconfiguration is disabled $m_{SRS,0}^{max} = \max_{SRS,0}$, where C is a SRS Bandwidth configuration and $C_{SRS}$ is the set of SRS Bandwidth configurations from the Tables 5.5.3.2-1 to 5.5.3.2-4 of TS 36.211 for each uplink bandwidth $N_{RB}^{UL}$, $N_{RA}$ is the number of format 4 PRACH in the addressed UpPTS and derived from Table 5.7.1-4 of TS 36.211, depending on the TDD UL/DL configuration and PRACH configuration index. In TDD with $T_{SRS} > 2$, type0-triggered SRS transmission instances are the subframes satisfying $(10 \cdot n_f + k_{SRS} - T_{offset}) \bmod T_{SRS} = 0$, where $k_{SRS}$ is defined in Table 8.2-3 of TS 36.213. The SRS transmission instances for TDD with $T_{SRS} = 2$ are the subframes satisfying $(k_{SRS} - T_{offset}) \bmod 5 = 0$. The value of $k_{SRS}$ is a function of the TDD special subframe configuration.

Other parameters related to SRS measurement but not listed above include C-RNTI of the target UE, Serving eNodeB eCGI, UL-EARFCN, cyclic prefix configuration, a parameter representing the total number of SRS transmissions for positioning, and a bitmap indicating which SRSs were dropped.

Now referring back to FIG. 1, eNodeB 101 first transfers the necessary SRS configuration data to e-SMLC 104 via MME 103, and e-SMLC 104 relays the necessary SRS configuration data to LMUs 105. Note that to reduce signaling overhead, among the various SRS parameters listed in FIG. 5, only part of the listed SRS parameters are deemed as necessary to the LMUs for accurate uplink SRS timing measurements.

FIG. 6 illustrates necessary SRS configuration data transferred from an eNodeB to an e-SMLC. Table 601 includes both general parameters and SRS-specific parameters. The general parameters include C-RNTI of the target UE, Physical Cell Id (PCI) for the PCELL, UL-EARFCN, the timing advance measurement for the UE in PCELL, and the serving eNodeB eCGI (FFS). The SRS-specific parameters for the PCELL which the SRS is configured include the uplink cyclic prefix configuration, the UL system bandwidth of the cell, the CELL-specific SRS bandwidth configuration (srs-BandwidthConfig), the UE-specific SRS bandwidth configuration (srs-Bandwidth), the number of antenna ports for SRS transmission (srs-AntennaPort), the frequency domain position, the SRS frequency hopping bandwidth configuration, the SRS-cyclic shift, the transmission comb, the SRS configuration index, MaxUpPt for time division duplex (TDD) mode, Group-hopping-enabled, and $\Delta_{SS}$ when SRS sequence hopping is enabled.

FIG. 7 illustrates necessary SRS configuration data transferred from an e-SMLC to an LMU. Table 701 includes both general parameters and SRS-specific parameters. The general parameters include C-RNTI of the target UE, Physical Cell Id (PCI) for the PCELL, UL-EARFCN, and search window parameters T (expected propagation delay) and $\Delta$ (delay uncertainty). The SRS-specific parameters for the PCELL which the SRS is configured include the uplink cyclic prefix configuration, the UL system bandwidth of the cell, the CELL-specific SRS bandwidth configuration (srs-BandwidthConfig), the UE-specific SRS bandwidth configuration (srs-Bandwidth), the number of antenna ports for SRS transmission (srs-AntennaPort), the frequency domain position, the SRS frequency hopping bandwidth configuration, the SRS-cyclic shift, the transmission comb, the SRS configuration index, MaxUpPt for time division duplex (TDD) mode, Group-hopping-enabled, and $\Delta_{SS}$ when SRS sequence hopping is enabled.

Figure 8:
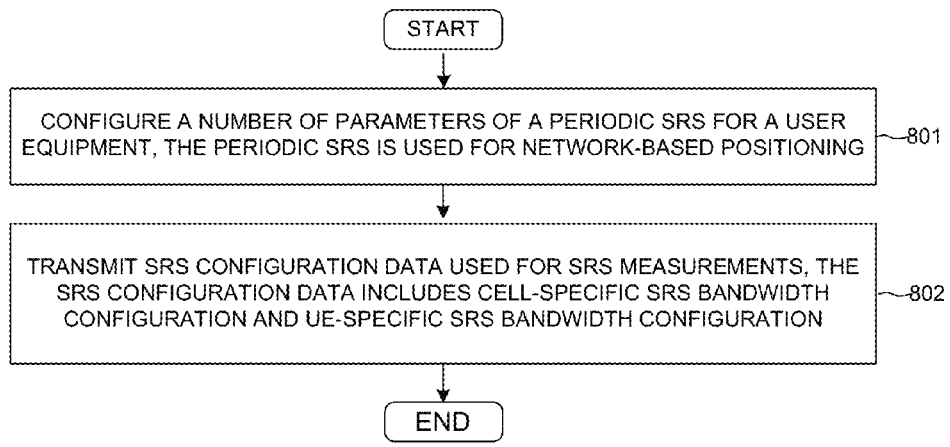
FIG. 8 is a flow chart of a method of network-based positioning from eNodeB perspective in accordance with one novel aspect.

FIG. 8 is a flow chart of a method of network-based positioning from eNodeB perspective in accordance with one novel aspect. In step 801, an eNodeB configures a number of parameters of a periodic sounding reference signal (SRS) for a user equipment (UE). The periodic SRS transmission is used for network-based positioning. In step 802, the eNodeB transmits SRS configuration data for SRS measurements performed by a location measurement unit (LMU). The SRS configuration data includes cell-specific SRS bandwidth configuration and UE-specific SRS bandwidth configuration. The SRS configuration data may further include a number of antenna ports for SRS transmission, SRS frequency hopping bandwidth configuration, information on whether SRS sequence-group hopping is enabled, and $\Delta_{SS}$ when SRS sequence hopping is enabled.

Figure 9:
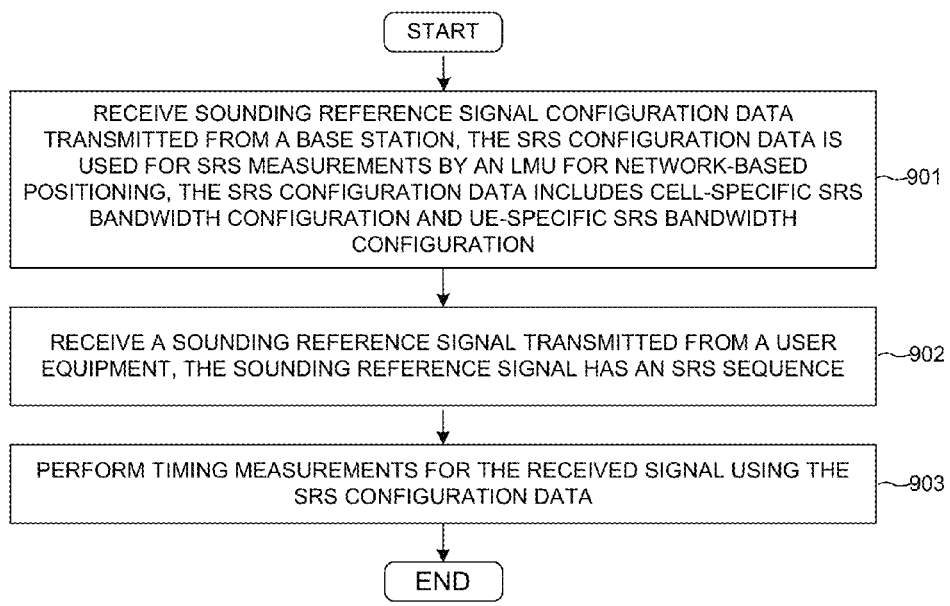
FIG. 9 is a flow chart of a method of network-based positioning from LMU perspective in accordance with one novel aspect.

FIG. 9 is a flow chart of a method of network-based positioning from LMU perspective in accordance with one novel aspect. In step 901, a location measurement unit (LMU) receives sounding reference signal (SRS) configuration data transmitted from an eNodeB. The SRS configuration data is for SRS measurement performed by the LMU for network-based positioning. The SRS configuration data includes cell-specific SRS bandwidth configuration and UE-specific SRS bandwidth configuration. In step 902, the LMU receives an SRS signal transmitted from a user equipment (UE). In step 903, the LMU performs timing measurement over the received signal using the SRS configuration data. In one embodiment, the LMU detects SRS dropping to avoid performance degradation of the network-based positioning.

The network-based positioning using SRS disclosed above is applied in PCELL. However, the same method can be applied in SCELL as well. In some embodiments, the network-based positioning using SRS may be applied in both PCELL and SCELL. Because PCELL and SCELL belong to different frequency bands, using both PCELL and SCELL for network-based positioning may produce positioning result that is more accurate.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving sounding reference signal (SRS) configuration data transmitted from a base station, wherein the SRS configuration data is used for SRS measurements by a location measurement unit (LMU) for network-based positioning, wherein the SRS configuration data includes cell-specific SRS bandwidth configuration and UE-specific SRS bandwidth configuration, and wherein the SRS configuration data further includes a total number of SRS transmissions for the positioning;
receiving a sounding reference signal transmitted from a user equipment, wherein the sounding reference signal has an SRS sequence, and wherein the SRS transmission is scheduled in specific uplink subframes for reducing SRS dropping based on predefined rules;
detecting an SRS dropping instance using cross-correlation between the SRS sequence and the received signal, wherein the SRS dropping instance is detected when a maximum value of the cross-correlation is below a threshold value; and
performing timing measurements for the received reference signal using the SRS configuration data.

2. The method of claim 1, wherein the SRS configuration data includes a number of antenna ports for SRS transmission, and wherein the number of antenna ports is set to one for the positioning.

3. The method of claim 1, wherein the SRS configuration data further includes SRS frequency hopping bandwidth configuration.

4. The method of claim 1, wherein the SRS configuration data further includes cell-specific information on whether SRS sequence-group hopping is enabled.

5. The method of claim 1, wherein the SRS configuration data further includes a delta sequence shift $\Delta SS$ when SRS sequence hopping is enabled.

6. A location measurement unit (LMU), comprising:
a radio frequency transceiver that receives sounding reference signal (SRS) configuration data transmitted from a base station, wherein the SRS configuration data is used for SRS measurements for network-based positioning, wherein the SRS configuration data includes cell-specific SRS bandwidth configuration and UE-specific SRS bandwidth configuration, wherein the SRS configuration data further includes a total number of SRS transmissions for the positioning, and wherein the RF module also receives a sounding reference signal transmitted from a user equipment, and wherein the SRS transmission is scheduled in specific uplink subframes for reducing SRS dropping based on predefined rules; and an SRS measurement module that performs timing measurements for the received reference signal using the SRS configuration data, wherein the measurement module also detects an SRS dropping instance using cross-correlation between an SRS sequence of the SRS signal and the received signal, and wherein the SRS dropping instance is detected when a maximum value of the cross-correlation is below a threshold value.

7. The LMU of claim 6, wherein the SRS configuration data includes a number of antenna ports for SRS transmission, and wherein the number of antenna ports is set to one for the positioning.

8. The LMU of claim 6, wherein the SRS configuration data further includes SRS frequency hopping bandwidth configuration.

9. The LMU of claim 6, wherein the SRS configuration data further includes cell-specific information on whether SRS sequence-group hopping is enabled.

10. The LMU of claim 6, wherein the SRS configuration data further includes a delta sequence shift $\Delta SS$ when SRS sequence hopping is enabled.

* * * * *